United States Patent
McNamara et al.

(10) Patent No.: US 12,132,617 B2
(45) Date of Patent: Oct. 29, 2024

(54) SEMI-AUTOMATED DEPLOYMENT FOR AN INTRA-SERVICE COMMUNICATION INFRASTRUCTURE

(71) Applicant: Oracle International Corporation, Redwood Shores, CA (US)

(72) Inventors: Sean Jay McNamara, Lehi, UT (US); Peter Michael Crossley, Sammamish, WA (US); Ryan Christopher Otis, Bastrop, TX (US); Ethan William Dereszynski, Oregon City, OR (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/742,626

(22) Filed: May 12, 2022

(65) Prior Publication Data

US 2023/0318926 A1 Oct. 5, 2023

Related U.S. Application Data

(60) Provisional application No. 63/325,106, filed on Mar. 29, 2022.

(51) Int. Cl.
*H04L 41/122* (2022.01)
*H04L 41/084* (2022.01)
*H04L 45/76* (2022.01)

(52) U.S. Cl.
CPC .......... *H04L 41/122* (2022.05); *H04L 41/084* (2013.01); *H04L 45/76* (2022.05)

(58) Field of Classification Search
CPC ...... H04L 41/122; H04L 41/084; H04L 45/76
See application file for complete search history.

(56) References Cited

U.S. PATENT DOCUMENTS

| | | | |
|---|---|---|---|
| 10,585,654 B2 | 3/2020 | Singh et al. | |
| 2006/0106842 A1 | 5/2006 | Diament et al. | |
| 2011/0154004 A1 | 6/2011 | Fischer | |
| 2016/0342396 A1* | 11/2016 | Kukolich | G06F 8/41 |
| 2017/0034031 A1* | 2/2017 | Willis | H04L 43/045 |
| 2018/0081919 A1* | 3/2018 | Stanfill | G06F 16/9024 |

* cited by examiner

*Primary Examiner* — David R Lazaro
*Assistant Examiner* — Zia Khurshid
(74) *Attorney, Agent, or Firm* — Invoke

(57) ABSTRACT

A system for generating a topology of components based on a set of components provided by a user. The system identifies, for each particular component of the first set of components, one or more characteristics. The characteristics may include at least one of: a rule associated with the particular component, a requirement associated with the particular component, a data input type corresponding to the particular component, and data output type corresponding to the particular component. Based on the characteristics, the system determines that an additional component not included in the first set of components is required for connecting the first set of components. The system selects the additional component and determines a topology of components that includes the first set of components and the additional component. The system also determines a dataflow between components in the topology of components.

20 Claims, 5 Drawing Sheets

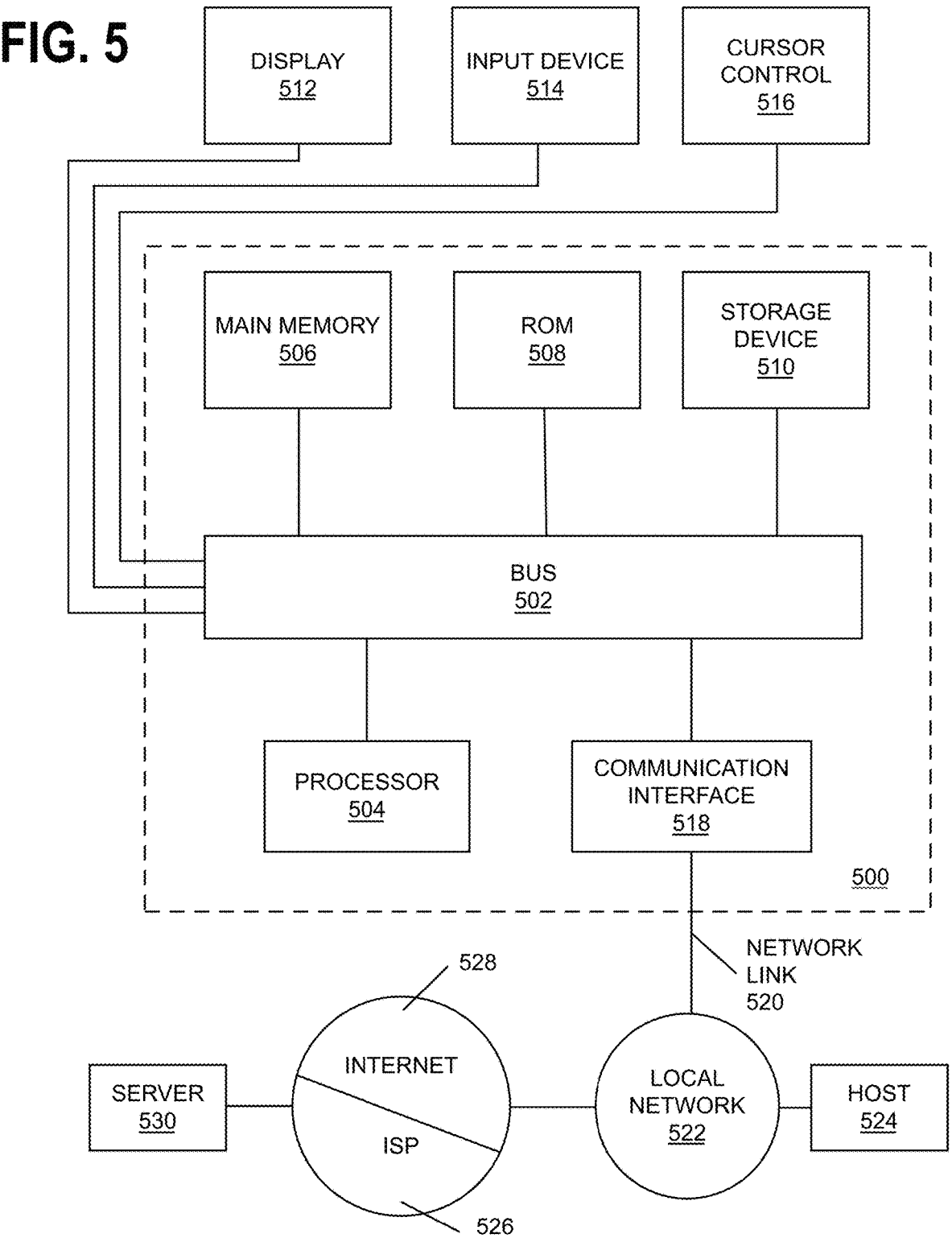

SEMI-AUTOMATED DEPLOYMENT FOR AN INTRA-SERVICE COMMUNICATION INFRASTRUCTURE

INCORPORATION BY REFERENCE; DISCLAIMER

The following application is hereby incorporated by reference: application No. 63/325,106 filed on Mar. 29, 2022. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to deploying an intra-service communication infrastructure in a cloud environment.

BACKGROUND

The deployment of a new service in a large, enterprise-wide software infrastructure is tricky, error-prone, and time consuming. The difficulties in deploying a new service are even greater when data sharing or data exchange is required as these connections are both development-resource and time intensive to create.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 shows a block diagram that illustrates a computer system in accordance with one or more embodiments.

DETAILED DESCRIPTION

Figure 1:
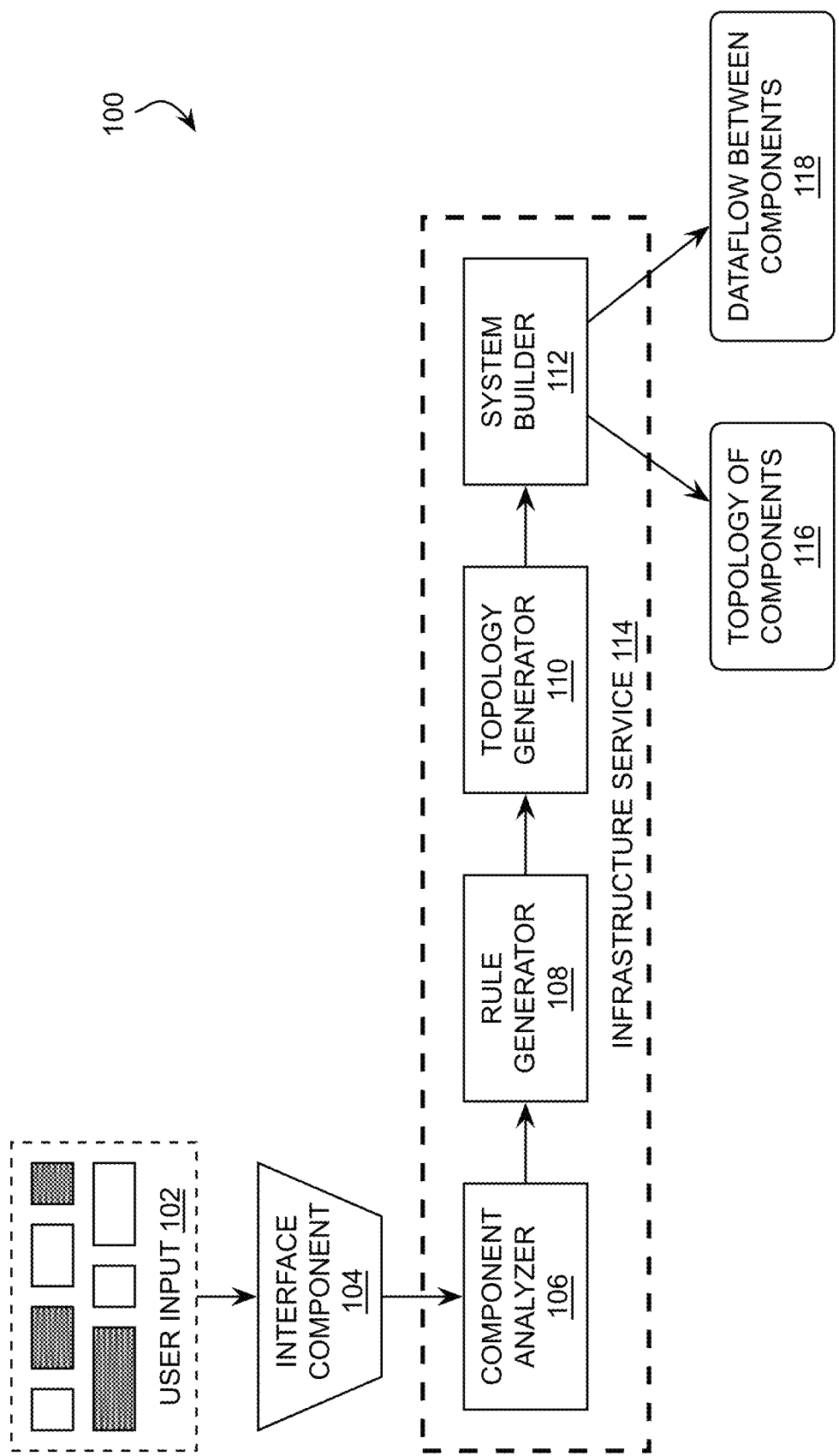
FIG. 1 illustrates a block diagram of an example system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MACHINE LEARNING MODEL
4. EXAMPLE EMBODIMENTS
5. COMPUTER NETWORKS AND CLOUD NETWORKS
6. HARDWARE OVERVIEW
7. MISCELLANEOUS; EXTENSIONS

1. General Overview

One or more embodiments generate a topology of components including user-selected components and system-selected components. The system selects components that are necessitated by the user-selected components. The system may select components to include in the topology of components based on any of the characteristics of the user-selected components. The characteristics associated with user-selected components may include, but are not limited to rules, requirements, data input types, and data output types. In an example, the user-selected components may require data input of a particular type that is not outputted by any of the other user-selected components. The system may select a component that outputs data of the particular type and the system-selected component to the set of components to be used for creating the topology. The system may select additional components, not included in the user-selected components, in response to determining that the user-selected components are insufficient to perform a function to be performed by the topology of components and that the additional component allows for the performance of the function.

The system may select the implementation environments for user-selected components and the system-selected components in the topology of components. As an example, the system may select, for each of the components, one of: an on-premise environment, an off-premise environment, and a cloud environment. The implementation environment may be selected based, for example, on efficiency, performance, security, and accessibility criteria.

One or more embodiments update a current topology of components during runtime without pausing or terminating components in the current topology. As an example, the system may add a component to the current topology of components and establish a connection with a component in the current topology of components. The current component may be configured to obtain data corresponding to any components on a periodic or continuous basis. The data may be used to implement a communication channel with the additional component.

One or more embodiments describe updating the topology of components based on a machine learning algorithm and model configured to optimize the determined topology of components based on operating an implementation of the determined topology of components with production data. The machine learning algorithm and model may receive feedback on performance of the implemented topology, and update the set of components and/or dataflow therebetween to improve performance of an updated topology.

In an embodiment, the system removes components from the set of components provided by the user in response to a more optimized topology of components that does not include the removed component being capable of providing a desired function, purpose, goal, or output from the topology. In a further embodiment, the desired function, purpose, goal, or output from the topology may be specified by the user. In an alternate embodiment, the desired function, purpose, goal, or output from the topology may be derived, at least, from the set of components provided by the user.

One or more embodiments described in this Specification and/or recited in the claims may not be included in this General Overview section.

2. System Architecture

One or more embodiments described below include an infrastructure service that semi-autonomously deploys an infra-service communication infrastructure in a cloud environment based on user input that describes a partial set of components to be implemented. The user input may be used to determine which resources and/or components are needed in the topology and how the resources and/or components are connected within the topology.

For ease of discussion, examples are described herein with reference to components produced by one or more specific vendors. For example, some examples include one or more components produced by Oracle International Corporation. Various embodiments are not limited to the specific components produced by the specific vendors used in these examples.

FIG. 1 illustrates a block diagram of an example system 100 in accordance with one or more embodiments. As illustrated in FIG. 1, system 100 includes an infrastructure service 114 that includes a component analyzer 106, a rule generator 108, a topology generator 110, and a system builder 112. Infrastructure service 114 may be implemented in hardware, software, or a combination thereof, in one or more embodiments. In an embodiment, infrastructure service 114 and/or one or more components thereof may be provided as Software-as-a-Service (SaaS). Infrastructure service 114 may generate and/or develop one or more types of architectures and/or services for multiple users and/or tenants. Some example architectures and/or services include, but are not limited to, communication services, networking, data processing, data pipeline scaling, data storage, content and media platform management, knowledge management, system and workflow automation, user application configuration, Internet of Things (IoT) management, user device management, information security, and resilience.

In one or more embodiments, infrastructure service 114 is configured to receive user input 102, via one or more interface components 104. Any type of interface component 104 may be used to receive the user input 102, such as a website, virtual private network (VPN), the Internet, a remote application, etc.

In one or more embodiments, user input 102 may include a set of resources and/or components that are intended to be included in a topology and/or architecture. For the remainder of the descriptions, the user input 102 will be described as including a set of components, but may include any combination of components, elements, modules, functions, resources, and/or processes, as would be understood by one of skill in the art. The topology or architecture will be designed for at least one particular purpose and/or to perform some functionality. In one embodiment, user input 102 may include the particular purpose(s) and/or desired functionality. In one or more embodiments, user input 102 may include one or more system dependencies and/or connections between at least two of the components specified in user input 102.

These system dependencies and/or connections may be used by infrastructure service 114 for connecting the various components together in the determined topology, as well as determining which possible topology is capable of connecting the specified components as described in the user input 102, while ascertaining if the topology will be able to provide the particular purpose(s) and/or desired functionality.

In one or more embodiments, component analyzer 106 is configured to analyze user input 102 to determine an essential or initial set of components that are specified in user input 102 for inclusion in the system-determined topology, at a minimum. Additional components may be needed to perform the particular purpose(s) and/or desired functionality, and/or to interconnect the set of components in accordance with one or more rules (as specified by rule generator 108). In one embodiment, some components specified in user input 102 may be identified by component analyzer 106 as being duplicative, unneeded, harmful, and/or unavailable. In one embodiment, component analyzer 106 is configured to not include any of these identified components in the essential set of components. However, component analyzer 106 will ensure that any topology which is generated by topology generator 110 will include each and every component specified in user input 102, when possible.

Component analyzer 106 may be implemented in hardware, software, or a combination thereof. Once component analyzer 106 generates the essential set of components, it passes this information to rule generator 108 and topology generator 110.

In one or more embodiments, rule generator 108 is configured to receive the set of essential components, as determined by component analyzer 106, and generate one or more rules, when applicable, for ensuring that any generated topology is functional, minimizes repetition, optimizes dataflow, adheres to common practice and protocols, separates tenant information, adheres to security and privacy restrictions, connects the components according to any interconnections specified in user input 102 (when available), and will perform the particular purpose(s) and/or desired functionality (when specified). Rule generator 108 may be implemented in hardware, software, or a combination thereof. Once the rule(s) are generated, or in parallel with functioning of topology generator 110, rule generator 108 provides the set of rules to topology generator 110 for use in generating one or more topology of components 116.

In one or more embodiments, topology generator 110 is configured to generate at least one topology of components 116 that include all essential components, connects the components in accordance with any specified interconnections (when available), and performs the particular purpose(s) and/or desired functionality (when specified). Multiple possible topologies may be generated for any given set of conditions. In one or more embodiments, an iterative process may be employed for narrowing down the possible topologies to arrive at a preferred topology that optimizes the connections, component and resource usage, minimizes latency and delay, and operates most efficiently. Moreover, in one or more embodiments, topology generator 110 may utilize at least one machine learning model to generate the topology of components 116 to conform to the set of rules provided by rule generator 108 in a "best fit" manner.

Topology generator 110 may be implemented in hardware, software, or a combination thereof. Once topology generator 110 creates the topology of components 116, it passes this information to system builder 112.

In one or more embodiments, system builder 112 is configured to build a working architecture based on the topology of components 116 that includes and optimizes dataflow between the components 118. System builder 112 considers and analyzes the positioning and hierarchy of the various components in the topology of components 116, along with all necessary interconnections and dependencies of the various components within the topology of components 116, to build a working architecture to achieve the particular purpose(s) and/or desired functionality. In one or more embodiments, system builder 112 may utilize at least one machine learning model to generate the working architecture and/or dataflow between the components 118. Moreover, an iterative process may be employed to refine the generated topology of components 116 and dataflow between the components 118 that constitute the working architecture over time, to further optimize the product and improve user experience while maintaining minimal user input to the overall process.

In one or more embodiments, topology generator 110 and/or system builder 112 may utilize at least one machine learning model to generate the topology of components 116 and/or the dataflow between the components 118, in various approaches. In an embodiment, the machine learning model(s) may be provided by a tenant, a user, etc., via interface component 104 or some other input technique. In one or more embodiments, topology generator 110 and/or system builder 112 may develop their own machine learning models based on one or more feedback loops, user input, historical performance, scoring, training, or a combination thereof.

Figure 2:
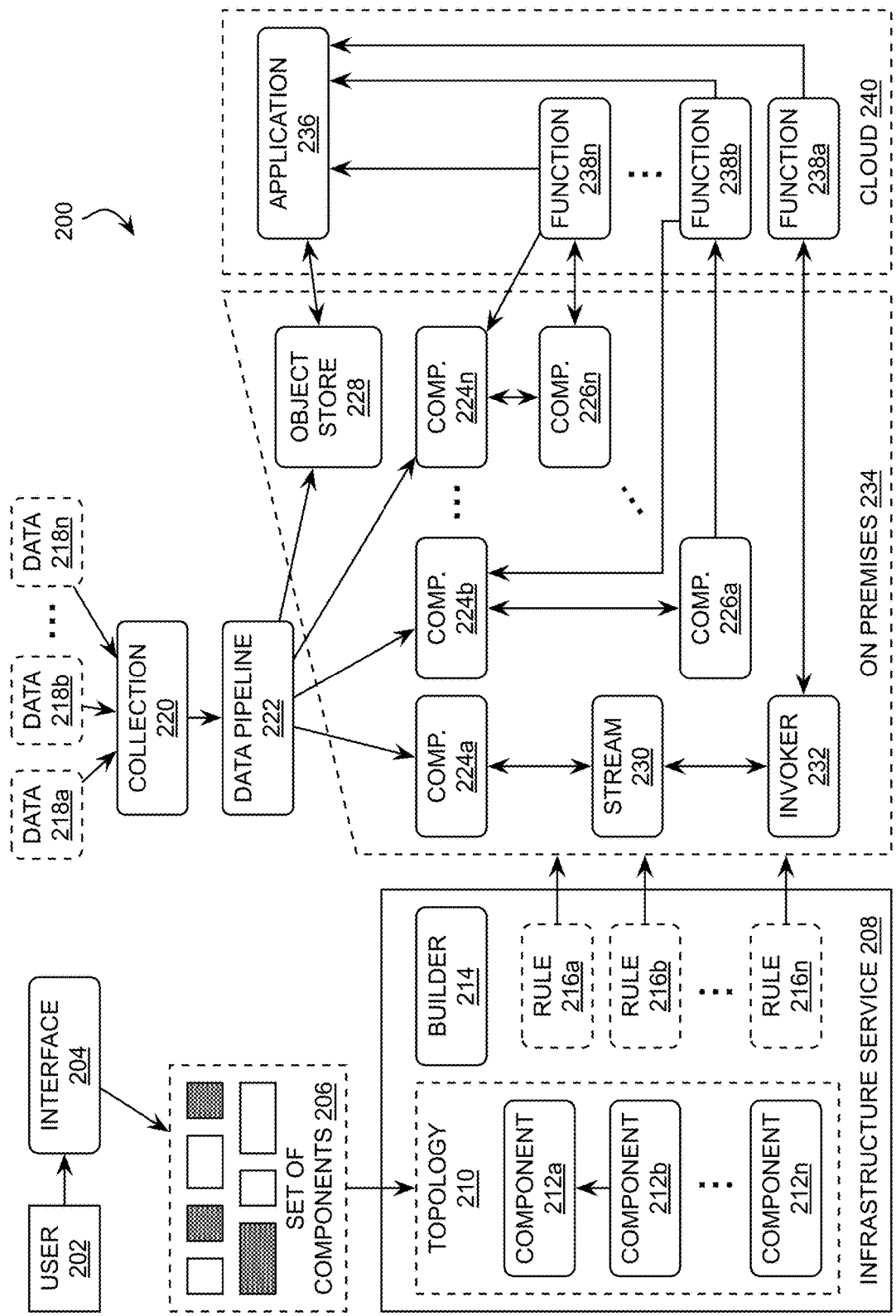
FIG. 2 illustrates an example system for generating a topology, in accordance with one or more embodiments.

FIG. 2 illustrates an example system 200 for generating a topology, in accordance with one or more embodiments. The various functions show in FIG. 2 are described as being performed by a "system," but any combination of hardware and software may be utilized to perform the various functions shown in the Figure. Greater detail of individual functions of system 200 are shown in FIG. 2 versus the more generalized descriptions in FIG. 1.

Referring again to FIG. 2, a user 202 (such as an administrator, information technology (IT) specialist, IT manager, etc.) inputs, at least a set of components 206 for inclusion in a topology which will be determined by the system. The set of components may be partial or incomplete in one or more embodiments. The user 202 utilizes an interface 204 for entry of the set of components 206, such as a GUI, a website, a VPN, a microphone, a pointing device, etc. The user 202 may attempt to include every component that will needed to complete a specific task, goal, calculation, function, or purpose. However, in some approaches, the set of components 206 may be incomplete and/or missing necessary components, and/or may include unnecessary, duplicative, and/or detrimental components. The inclusion or exclusion of the components in the set of components 206 may be weighed against achieving the desired functionality for the set of components in order to determine if every needed component, and no extra components, are in the set of components 206.

In one or more embodiments, the set of components 206 may also include associated metadata for each of the selected components, or the metadata may be input separately by the user 202. Each of the user-selected components may be associated with respective metadata that describes one or more characteristics of the various components, such as name, function, required elements for use with the component, etc. In an example, the metadata may describe input(s)/output(s). In a further example, the metadata may indicate any of format, protocol, bandwidth, speed, throughput, etc., for at least one input/output and/or the overall component.

In an example, the metadata may include one or more rules that dictate necessary or required conditions for implementation of the respective component. For example, to use component w, the system 200 must implement security component x, encryption component y, data compression component z, etc. Accordingly, the rules are not always generated by the system 200 or element of the system 200 (e.g., a rule generator) and may be complemented by or completely provided by another source(s), such as metadata associated with the components. In an approach, the rule(s) may be received (or any of the other characteristics for making topology determinations) and system 200 will determine, based on the received rule(s), which additional components are need based on these characteristics (and possibly the desired functionality for the set of components, when known).

In one or more embodiments, infrastructure service 208 receives the set of components 206 and generates a topology 210 based on the set of components 206. Each component 212 in the determined topology 210 (e.g., component 212a, component 212b, component 212n) is positioned within the determined topology 210 relative to one another and appropriately interconnected in order to achieve a desired purpose or function. The desired purpose or function may be provided by the user 202, in one or more embodiments, or derived from the set of components 206. The infrastructure service 208 may derive, calculate, or otherwise determine the desired purpose or function based on historical preferences, analysis of possible configurations, machine learning model analysis, etc., in one or more embodiments.

Builder 214 analyzes the topology 210 in light of one or more rules 216 (e.g., rule 216a, rule 216b, . . . , rule 216n) to generate at least one topology for placing the set of components 206, one or more additional components, removing redundant or unnecessary components from the set of components 206, creating appropriate interconnections therebetween, determining if one or more functions 238 are needed for processing results and/or intermediate values, and determining whether one or more applications 236 are needed to provide the desired purpose or function. The infrastructure service 208 generates the rules 216 to ensure that a working architecture is produced for a tenant to be implemented on premises 234 and/or remotely (e.g., in the cloud 240). The rules 216 may be generated based on any of the following: the set of components 206, the desired purpose or function, and any specified interconnections and/or dependencies between the various components 212.

The infrastructure service 208 determines which components will be placed on premises 234 and which components will be placed remotely (e.g., in the cloud 240). Of course, the placement, interconnections, and inclusion of some or all of the components 224, 226, object store(s) 228, stream(s) 230, and invoker(s) 232 on premises 234, and functions 238 and application(s) 236 executed in the cloud 240 may be adjusted and/or modified based on the desired purpose or function for the topology and changing requirements of the user 202 and data flow 218 into the data pipeline 222. The topology shown in FIG. 2 is for example only, and not meant to be limiting on any possible arrangement of elements for a determined topology.

In one example topology, a set of components 224 (e.g., component 224a, component 224b, . . . , component 224n) are connected to a data pipeline 222 for data intake. The data pipeline 222 receives data from one or more sources (e.g., data 218a, data 218b, . . . , data 218n), which may be collected and/or aggregated (e.g., collection 220) prior to being delivered to the data pipeline 222. In some embodiments, the data 218 may be filtered in accordance with one or more rules 216 prior to or after entering the data pipeline 222.

In the example topology shown, component 224a provides data to a stream 230, which is accessed by an invoker 232. Stream 230 and invoker 232 are example types of components that may be included in a topology, among many other types of components. Each of component 224a, stream 230, and invoker 232 are able to receive and send data to one another (bidirectional communication) in this example. However, in other examples, communications between one or more of these elements may be unidirectional. Moreover, invoker 232 is in bidirectional communication with function 238a in the cloud 240, but this communication may also be unidirectional in some instances.

On premises 234, in this example topology, at least one database and/or object store 228 receives data from the data pipeline 222, and/or may receive data from one or more of the other components 224, 226. Also, a series of components 224 (e.g., component 224a, component 224b . . . , component 224n) process data from the data pipeline 222 and provide the processed data to components 226 (e.g., component 226a, . . . , component 226n) and/or stream 230, and invoker 232. The components 226 further process the data on premises 234 prior to providing it to various functions 238 (e.g., function 238a, function 238b, . . . , function 238n) in the cloud 240.

For example, a component 224b provides data to component 226a, as well as receiving feedback or instructions directly from function 238b in the cloud 240. However, this feedback may be provided to component 226a in an example, or passed from component 226a to component 224b in another example. In turn, function 238b processes the data in accordance with its specific logic or programming, and provides result(s) to application 236. Infrastructure service 208 has determined that the various functions 238 and application(s) 236 provide an optimized topology for providing the desired purpose or function, and therefore has dictated their placement and inclusion as shown in the example topology.

On premises 234, each of the various components 224, 226, the object store(s) 228, stream(s) 230, and invoker(s) 232 may be arranged, positioned, connected, and/or isolated to achieve the desired purpose or function for the topology.

In the cloud 240, the various functions 238 (e.g., function 238a, function 238b, function 238n) may have any purpose, functionality, design, algorithm, calculation, inputs, outputs, and/or parameters in order to perform their specified task(s). These functions 238 may provide result(s) back to any component 224, 226 or object store 228 on premises 234, and/or to one or more application(s) 236 or object store(s) in the cloud 240. A series of functions 238 may be employed for generating complex results from one or more data inputs in some examples. Moreover, additional applications 236 may be employed to provide multi-level processing and complex determinations for the example topology.

As the set of components 206, specified interconnections, dependencies, and/or desired purpose or function for the topology changes over time, the at least one topology generated by infrastructure service 208 may also change to reflect the differences in the input conditions for builder 214 and rules 216. These changes may be enacted on-the-fly in the cloud 240 and on premises 234, in some approaches, to account for the changing environment.

In one example, data streaming may be used as an asynchronous message bus that acts independently and at its own pace to decouple components of large systems. A data stream 230 is a component that may be used as an alternative for traditional file-scraping approaches to help make critical operational data more quickly available for indexing, analysis, and visualization. In another example, data stream 230 may capture activity from websites or mobile apps, such as page views, searches, or other user actions. This information may be used for real-time monitoring and analytics, and in data warehousing systems for offline processing and reporting. In another example, data stream 230 may be used as a unified entry point for cloud components to report their lifecycle events for audit, accounting, and related activities.

One specific illustration of a data stream 230 and its corresponding elements is a series of data transactions generated by clickstream data and grouped together in a collection 220. Examples of elements in a data stream may include webpage requests, updates to a shopping cart associated with a user account, changes to a user profile, purchases, returns, and the like. Other examples of elements in a data stream 230 include changes to streamed sensor data, such as data transmissions associated with changes in steps taken, elevation change, location tracking coordinates, temperature, humidity, manufacturing process conditions, etc. Moreover, a data stream 230 may include similar events tracked for successive units of time, e.g., every 10 milliseconds (ms), 100 ms, 1 second, 1 minute, etc.

Another example of elements in a data stream 230 (that of a processing pipeline or workflow) include operations, analyses, or processes to be executed on a set of data items. Embodiments of a processing pipeline include a set of sequentially arranged algorithms that operate on corresponding elements in a set of data items. Still another example of a data stream 230 may include events, each event being a vector representation of a data item. For example, events that are algorithms in a first data stream may operate on corresponding data item events in a second data stream, thereby producing a third data stream of vector events, where each vector event is a representation of a corresponding non-vector data item event in the first data stream.

Moreover, some data streams may be accessed and operated on by other data streams and/or computing applications to transform events within a first data stream from one object type or data type into another object type or data type. That is, data streams may be successively operated on, analyzed and/or transformed multiple times to produce a desired result data stream. In some examples, this successive processing is referred to as a "processing pipeline." In some examples, a result data stream may include vector representations of data items or transformed versions of data items (e.g., converted to an alternative data type or data representation structure). In other examples, a result data stream may include transformed data produced by the operation of one or more applications and/or algorithms (e.g., machine learning, document-to-vector, etc.) on another data stream.

Examples of an association by which a data stream may be generated include those that generate events (e.g., data transactions/updates) from a common source, a common computing application, a common webpage, a common transaction/data type, and/or a common entity (e.g., a business or organization). The associated transactions may be collectively grouped together to form a data stream 230. In a further example, a data stream of associated events may then be processed by one or more machine learning applications, thereby generating an analysis that interprets the data (e.g., via a query or real-time data trend monitoring), a result data stream, and/or a prediction.

An invoker 232 is a component that may implement client-side communication protocol activities that are used as a communication channel between applications, such as enterprise applications, distributed applications, cloud applications, etc. In one example, invoker 232 may be used for client-side Hypertext Transfer Protocol (HTTP) protocol activities to execute simple HTTP requests and to invoke representational state transfer (REST) and/or simple object access protocol (SOAP) web services.

In another example, invoker 232 may be used to hide details of calling into application endpoint implementation. In this example, a container would hand over an implementation of invoker 232 to JAX-WS runtime, and JAX-WS runtime calls invoke(java.lang.reflect.Method, java.lang.Object . . . ) for a web service invocation. Finally, invoker 232 does the actual invocation of web service on the endpoint instance. Container also injects the provided WebServiceContext and takes care of invoking javax.annotation.PostConstruct methods, if present, on the endpoint implementation.

In one or more embodiments, infrastructure service 208 may utilize at least one machine learning model to generate the topology 210 and/or dataflow between the components, in various approaches. In an embodiment, the machine learning model(s) may be provided by a tenant, a user, etc., via interface 204 or some other input technique. In one or more embodiments, builder 214 and/or infrastructure service 208 may develop their own machine learning models based on one or more feedback loops, user input, historical performance, scoring, training, or a combination thereof.

Additional embodiments and/or examples relating to computer networks are described below in the section titled "Computer Networks and Cloud Networks."

In one or more embodiments, one or more components of system 100 and/or system 200 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, system 100 and/or system 200 may include a data repository (not shown in FIGS. 1 and 2). A data repository is any type of storage unit and/or device (e.g., a file system, database, collection of tables, and/or any other storage mechanism) for storing data. The data repository may include multiple different storage units and/or devices. The multiple different storage units and/or devices may or may not be of the same type or located at the same physical site. The data repository may be implemented or executed on the same computing system as one or more other components illustrated in FIGS. 1 and 2 and/or on a separate computing system. The data repository may be communicatively coupled to one or more other components via a direct connection or via a network. Information may be implemented across any of the components of the platform other than the data repository.

In one or more embodiments, system 100 and/or system 200 may include a user interface (e.g., interface component 104, interface 204). A user interface refers to hardware and/or software configured to facilitate communications between a user and one or more components of system 100 and/or system 200. The interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Different components of the interface may be specified in different languages. For example, the behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, the interface may be specified in one or more other languages, such as Java, Python, C, or C++.

3. Machine Learning Model

In one or more embodiments, a machine learning algorithm may be included in system 100 and/or system 200 for determinations of the at least one topology, interconnections, rules, dependencies, and any other relevant features, aspect, and/or characteristics of the architecture generated by the infrastructure service. A machine learning algorithm is an algorithm that can be iterated to learn a target model that best maps a set of input variables to one or more output variables, using a set of training data. The training data includes datasets and associated labels. The datasets are associated with input variables for the target model. The associated labels are associated with the output variable(s) of the target model. For example, a label associated with a dataset in the training data may indicate whether the dataset is in one of a set of possible data categories. The training data may be updated based on, for example, feedback on the accuracy of the current target model. Updated training data may be fed back into the machine learning algorithm, which may in turn update the target model.

A machine learning algorithm may generate a target model such that the target model best fits the datasets of the training data to the labels of the training data. Specifically, the machine learning algorithm may generate the target model such that when the target model is applied to the datasets of the training data, a maximum number of results determined by the target model match the labels of the training data. Different target models be generated based on different machine learning algorithms and/or different sets of training data.

The machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In an embodiment, system 100 may include a training pipeline (not shown in FIG. 1) configured to train the machine learning model. Training may occur after the topology of components 116 and/or dataflow between the components 118 is generated by infrastructure service 114. In another embodiment, system 200 may include a training pipeline (not shown in FIG. 2) configured to train the machine learning model. Training may occur after the topology 210 and/or dataflow between the components is generated by infrastructure service 208. In a further approach, training may occur before using the machine learning model on production data. Alternatively or additionally, training may occur on an ongoing basis, in a feedback loop that refines the machine learning model based on results obtained using production data.

In the training pipeline, a scheduler may be configured to trigger an orchestrator to obtain information about the machine learning model. The orchestrator is configured to activate or "spin up" an enterprise integrator model for the pipeline. The enterprise integrator model is configured to activate or "spin up" a job (e.g., a Kubernetes job) to perform the training. The job executes to perform training on the machine learning model and continues operating until one or more completion criteria are satisfied (e.g., all training data has been processed). The orchestrator may be configured to poll for the status of any training job(s).

In an embodiment, a scoring pipeline may be used in conjunction with the machine learning model. The scoring pipeline is configured to perform scoring using a trained machine learning model. The scoring pipeline generates one or more insights by applying the trained machine learning model to production data. Scoring is only one example of how a machine learning model may be used; other examples include, but are not limited to, generating one or more predictions, adjusting parameters and/or results based on performance with production data, and/or using an output of the machine learning model to continue training the machine learning model.

To perform scoring, an orchestrator may initiate the scoring pipeline (e.g., in the corresponding Kubernetes pod). The scoring pipeline may be configured to pull data from its source (e.g., one or more data platforms that may be external to the secure modular machine learning platform) and store the data in tenant-specific storage (e.g., an object store associated with the tenant). The scoring pipeline (e.g., code executing in the Kubernetes pod) is configured to obtain the data from storage and apply the machine learning model to the data. The scoring pipeline may be configured to store the output of the machine learning model (e.g., newly scored data) in the object storage and/or transmit the output to the external data source.

In an embodiment, a secure modular machine learning platform includes one or more components described herein that help isolate tenants and/or users from each other. The secure modular machine learning platform may be configured to execute an orchestrator on an existing cluster (e.g., a Kubernetes cluster), separate from the tenant-specific cluster. Tenant-specific clusters may be configured to execute only tenant-provided images and/or machine learning models. The orchestrator may be configured to transmit instructions to the pipelines, to perform their respective functions.

In some examples (e.g., data science applications), the orchestrator may be configured to utilize an autonomous database for transaction processing (ATP). The orchestrator may be configured to use one or more platform-supplied ("out-of-the-box") machine learning models. Alternatively or additionally, the orchestrator may be configured to use a microservice framework, such as Minerva produced by Oracle International Corporation. Alternatively or additionally, the orchestrator may be configured to trigger tenant-specific machine learning models in tenant-specific clusters. Tenant-supplied code executing in the tenant-specific clusters is configured to utilize the respective tenant-specific machine learning model(s). In an embodiment, all communication with tenant-specific clusters (e.g., a call to initiate a scoring process) initiates from the orchestrator's "master" cluster.

In an embodiment, each tenant's code executes in its own virtual cloud network (VCN). Each tenant's respective VCN may be separated from others by firewall rules. Each VCN may be configured to accept only incoming data ("ingress") to the tenant-specific cluster. Alternatively or additionally, each cluster may expose only a limited set of ports. For example, a cluster may expose only port 22 for secure shell (SSH), port 80 for hypertext transfer protocol (HTTP), and port 443 for secure HTTP (HTTPS). The platform may not include any mechanism to allow the tenants' respective VCNs to communicate with each other.

4. Example Embodiments

Detailed examples are described below for purposes of clarity. Components and/or operations described below should be understood as one specific example which may not be applicable to certain embodiments. Accordingly, components and/or operations described below should not be construed as limiting the scope of any of the claims.

Figure 3:
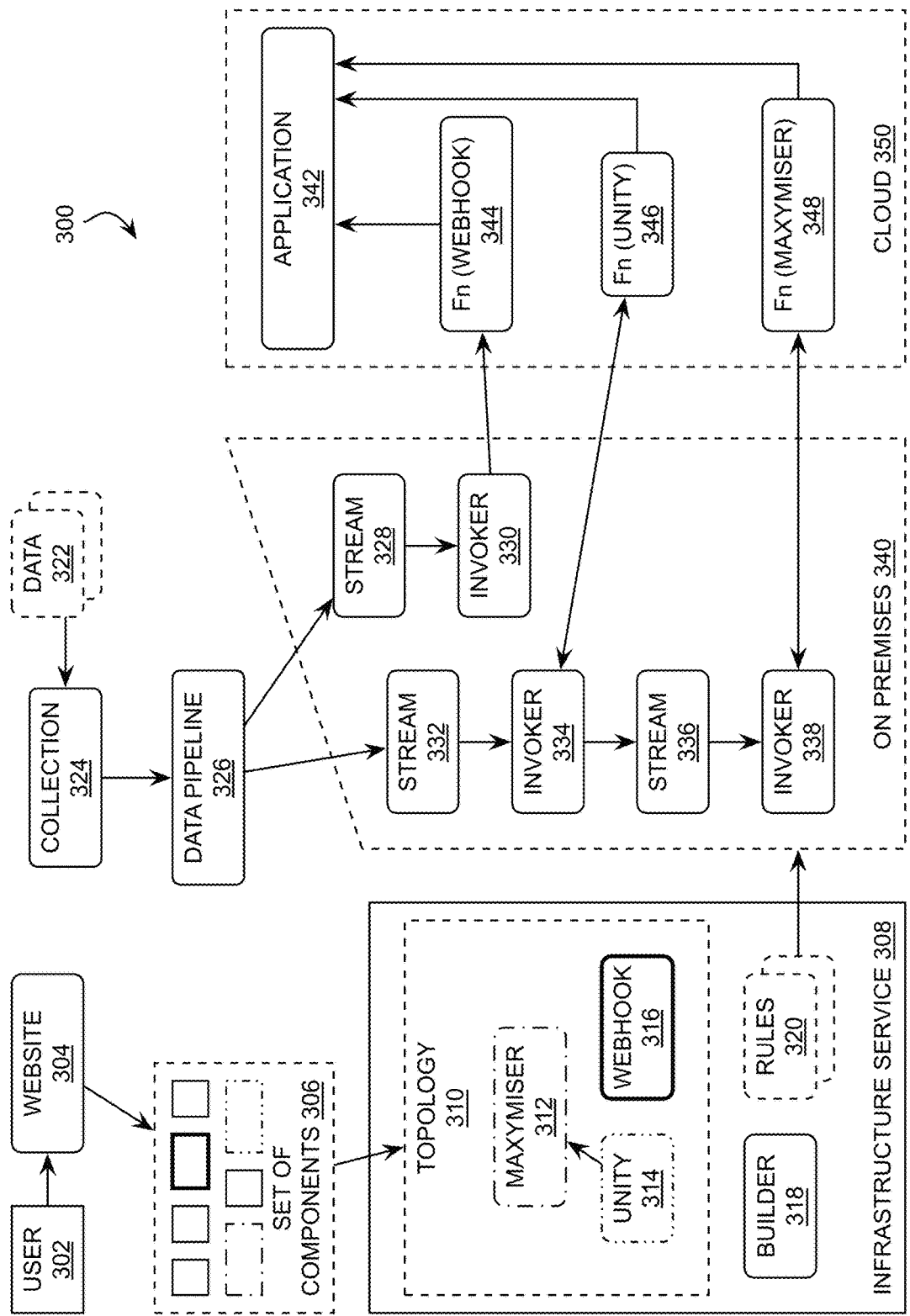
FIG. 3 illustrates a system generating an example topology, in accordance with one or more embodiments.

FIG. 3 illustrates a system 300 generating an example topology, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments. Although the operations are described in FIG. 3 as being executed by a system 300, any hardware, software, or combination thereof may be used to execute the various operations described in FIG. 3 in one or more embodiments.

A user 302 inputs a set of components 306 for inclusion in a topology to be determined by the system. The set of components 306 may be incomplete in one approach, and/or may include extraneous components in an approach. The user 302 utilizes a website 304 for entry of the set of components 306.

In one or more embodiments, the set of components 306 may also include associated metadata for each of the selected components, or the metadata may be input separately by the user 302. Each of the user-selected components may be associated with respective metadata that describes one or more characteristics of the various components, such as name, function, required elements for use with the component, etc. In an example, the metadata may describe input(s)/output(s). In a further example, the metadata may indicate any of format, protocol, bandwidth, speed, throughput, etc., for at least one input/output and/or the overall component.

In an example, the metadata may include one or more rules that dictate necessary or required conditions for implementation of the respective component. For example, to use component w, the system 300 must implement security component x, encryption component y, data compression component z, etc. Accordingly, the rules are not always generated by the system 300 or element of the system 300 (e.g., a rule generator) and may be complemented by or completely provided by another source(s), such as metadata associated with the components. In an approach, the rule(s) may be received (or any of the other characteristics for making topology determinations) and system 300 will determine, based on the received rule(s), which additional components are need based on these characteristics (and possibly the desired functionality for the set of components, when known).

In one or more embodiments, infrastructure service 308 receives the set of components 306 and generates one or more topologies 310 based on the set of components 306, each topology being including each of the components from the set of components 306 arranged to perform a specific function or purpose. In this example, the set of components 306 includes Oracle International Corporation Maxymiser 312, Oracle International Corporation Unity 314, and a Webhook 316. Moreover, there is an interconnection from Unity 314 to Maxymiser 312 indicated by the user 302. This example only includes three components for sake of simplicity, and many more components, complexities, interconnections and dependencies may be indicated by the user 302 when developing a full architecture.

Builder 318 component of infrastructure service 308 determines at least one topology 310 that includes the requested components: Maxymiser 312, Unity 314, and Webhook 316, along with an interconnection from Unity 314 to Maxymiser 312. The determination of the various topologies 310 is based on one or more rules 320, which are determined by infrastructure service 308 to ensure that dataflow is possible between the various components, inputs match up with outputs, data conversion and modification that is necessary between the components is performed, etc. Once the various topologies are created, the best topology to perform the specific function or purpose is selected by infrastructure service 308 to generate the architecture.

The topology 310 is determined and selected, and then a system is implemented on premises 340 and/or in the cloud 350 in accordance with the selected topology 310. Thereafter, production data 322 from one or more sources is received and put in a collection 324, from which a data pipeline 326 is generated, in an approach. As shown in this example, on premises 340 there are three streams 328, 332, 336, with streams 328 and 332 receiving data from data pipeline 326, while stream 336 receives processed data from invoker 334. Each stream 328, 332, 336 feeds a respective invoker 330, 334, 338, which pass data to various functions set up in the cloud 350 according to the selected topology 310. As shown, invoker 330 provides data to a Webhook function 344, invoker 334 sends and receives data with a Unity function 346, and invoker 338 sends and receives data with a Maxymiser function 348. Because topology 310 required an interconnection from Unity 314 to Maxymiser 312, Unity function 346 provides data back to invoker 334, which passes this data to stream 336 for invoker 338, which passes it along to Maxymiser function 348, thereby providing the interconnection required in topology 310.

Each of the functions in the cloud 350 provide result(s) to an application 342, which is selected and/or configured by infrastructure service 308 to use the result(s) of the various functions to perform the specific function or purpose designated for topology 310.

As the set of components 306, specified interconnections, dependencies, and/or specific function or purpose for the topology changes over time, the at least one topology 310 generated by infrastructure service 308 may also change to reflect the differences in the input conditions for builder 318 and rules 320. These changes may be enacted on-the-fly in the cloud 350 and on premises 340, in some approaches, to account for the changing environment. Moreover, infrastructure service 308 may iteratively change topology 310 to refine and improve functioning, efficiency, resource-usage, and other measurable qualities of topology 310, and/or generate additional possible topologies in an attempt to improve upon the selected topology 310.

Figure 4:
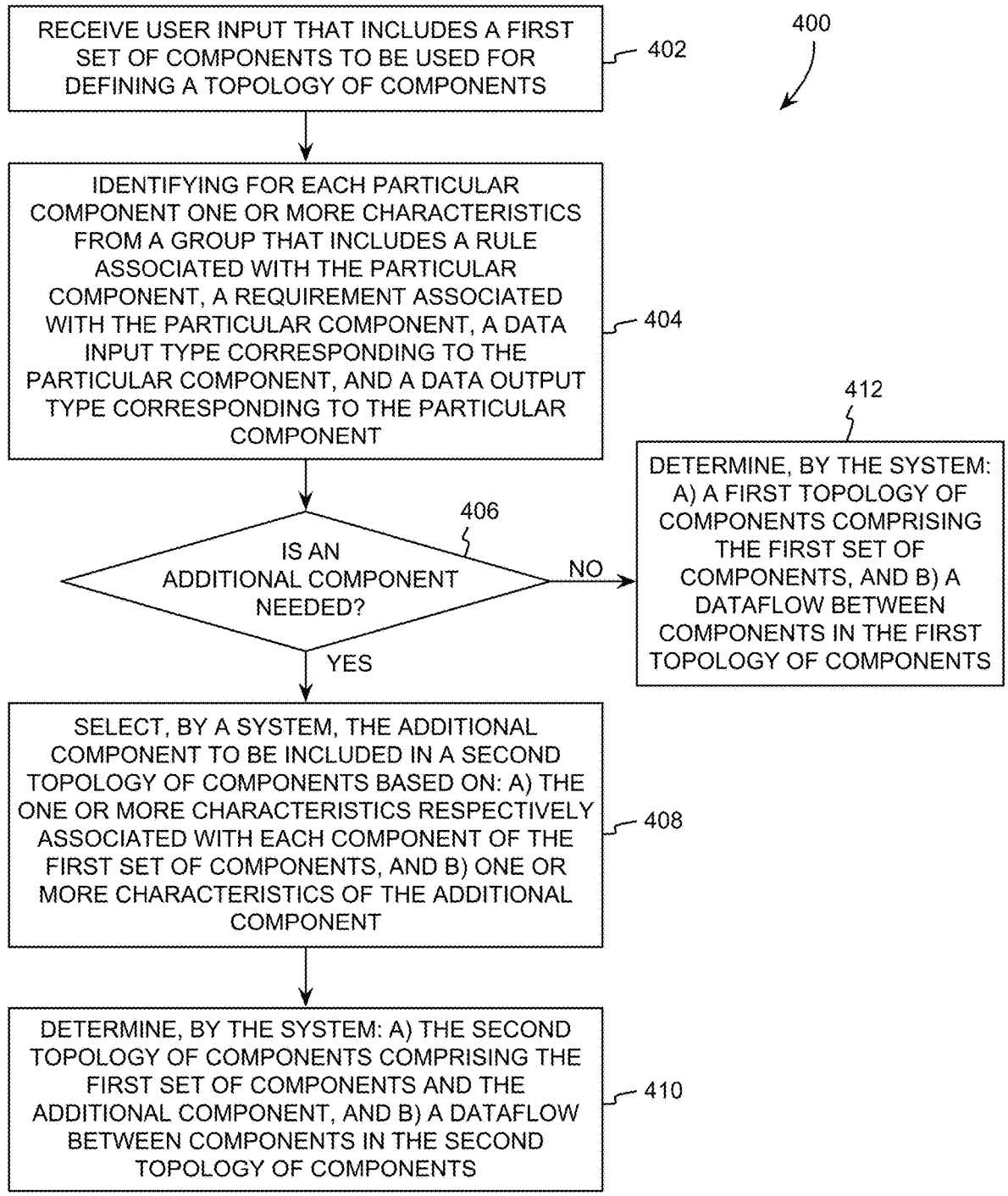
FIG. 4 illustrates an example set of operations for generating a topology and dataflow in accordance with one or more embodiments.

FIG. 4 illustrates an example set of operations 400 for generating a topology and dataflow in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments. Although the operations are described in FIG. 4 as being executed by a system, any hardware, software, or combination thereof may be used to execute the set of operations 400 in one or more embodiments.

In Operation 402, a system receives user input that includes, at least, a first set of components to be used for defining a topology of components. The user input may also include interconnections between one or more components, dependencies between one or more components, an order or sequence for the components, a desired function, purpose, goal, or output from the first set of components, etc. In an embodiment, any and/or all of this information may be inferred, identified, and/or determined based on the first set of components alone, or in addition to other available information (such as historical preferences, machine learning model, scoring, past results, an identity of a requester, an activity to be performed, etc.). In Operations 404-412, the system generates the topology of components based on the set of components.

In one embodiment, the first set of components may be a selection of commercially available products from one or more software/architecture/networking vendors. These components may be selected to achieve a business or organizational objective.

The system identifies, for each particular component of the first set of components, one or more characteristics that describe the component in Operation 404. The characteristics may include any relevant information about the component, such as name, functionality, source, number of inputs, number of outputs, names of values and/or parameters associated with the particular component, data input type(s) of the particular component, data output type(s) of the particular component, a rule associated with the particular component, a requirement associated with the particular component, a constraint for the particular component, other types of components related to the particular component, etc. Components may be of any type known in the art, such as a stream, object store, database, invoker, consumer, functional block, collector, parser, filter, etc.

The system determines whether an additional component (not included in the first set of components) is required for connecting the first set of components in Operation 406, such as to achieve the desired function, purpose, goal, or output. This determination, in one embodiment, is based on the one or more characteristics respectively associated with each component of the first set of components. In a further embodiment, this determination may also consider available resources on premises and/or in the cloud (that may not be known to the user), more efficient or better performing components than those specified in the first set of components, components which perform multiple tasks specified by components in the first set of components, interconnectivity constraints and/or rules that affect how components in the first set of components may be interconnected, etc.

The additional component may be of a type specified in the first set of components or a different type of component. Moreover, the additional component may be selected in order to ensure that all the components in the first set of components are able to work together, communicate properly, share data, protect data and privacy, and achieve the desired function, purpose, goal, or output once implemented in an architecture on premises and/or in the cloud.

Responsive to the system determining that an additional component is needed, in Operation 408, the system selects the additional component to be included in a second topology of components. The selection of the second component may be based on any relevant information available to the system, and in one embodiment, includes: a) the one or more characteristics respectively associated with each component of the first set of components, and b) one or more characteristics of the additional component. the characteristics of the additional component may be compared with needs, deficiencies, problems, and/or inefficiencies in the first set of components when attempting to design a topology that can achieve the desired function, purpose, goal, or output.

According to one or more embodiments, the system selects an implementation environment for the additional component and/or the first set of components. The implementation environment may be selected based on any relevant information, such as where components are physically located, a cost for acquiring and/or implementing components in different environments, a required or permissible sequence or ordering of components, the desired function, purpose, goal, or output, etc. Any available environment may be specified, such as an on-premise environment, an off-premise environment, a split-installation environment, a remote computing environment, and/or a cloud environment. In one embodiment, the topology of components may be distributed across different environments.

In one or more embodiments, the system selects the additional component in response to determining that the additional component is associated with a first data input type that matches a first data output type corresponding to a first component of the first set of components. In other words, the output of one component may be used to choose a second component to add to the topology based on the input of the second component matching with the output of the first component. In this approach, the additional component would be placed in the topology in a location to accept data from the first component.

Various types of data input and output types are possible for use with the various components, and may be based on any possible distinction, such as data protocol, data format, data size, data transmission speed, physical connection type, hardware or software-based implementation of the component, etc.

In a further embodiment, the system may select the additional component in response to determining that none of the first set of components is associated with any data input type that matches the first data output type corresponding to the first component of the first set of components. In other words, the system may determine that there is insufficient data input types within the first set of components in order to accept data from a particular data output type of the first component. Thus, the system will select a component that is configured to accept, as an input, the data output type of the first component. The system will then connect the output of the first component to the input of the additional component.

In one or more embodiments, the system selects the additional component in response to determining that the additional component is associated with a first data output type that matches a first data input type corresponding to a first component of the first set of components. In other words, the input of one component may be used to choose a second component to add to the topology based on the output of the second component matching with the input of the first component. In this approach, the additional component would be placed in the topology in a location to provide data to the first component.

In a further embodiment, the system may select the additional component in response to determining that none of the first set of components is associated with any data output type that matches the first data input type corresponding to the first component of the first set of components. In other words, the system may determine that there is insufficient data output types within the first set of components to provide data to a particular data input type of the first component. Thus, the system will select a component that is configured to provide data, as an output, that corresponds to the data input type of the first component. The system will then connect the input of the first component to the output of the additional component.

According to one or more embodiments, the system selects the additional component based on a data input type of data to be transmitted to the topology of components. In other words, data in a data pipeline is considered when selecting the additional component to add to the topology of components, and may include an application, function, or some other type of component.

In one embodiment, the system may generate the second topology of components by modifying a prior topology of components, thereby creating a second topology of components that improves upon the prior topology in some way, e.g., actually capable of performing the desired function, purpose, goal, or output, operates more quickly, operates more efficiently, operates less expensively, operates using less components, operates using more reliable components, etc.

In a further embodiment, the second topology of components may be generated by the system at runtime while components in the prior topology of components are executed and without interrupting functioning of the prior topology of components during a time in which the second topology of components is generated and up until the system transitions over execution to the second topology of components.

The system determines in Operation 410, based on selection of the second component: a) the second topology of components that includes the first set of components and the additional component, and b) a dataflow between components in the second topology of components. The dataflow between components may be based on an order, sequence, interconnection, and/or dependency between at least some of the components in order to achieve the desired function, purpose, goal, or output from the second topology of components.

Responsive to the system determining that an additional component is not needed (e.g., to achieve the desired function, purpose, goal, or output), the system determines in Operation 412: a) the first topology of components that includes the first set of components, and b) a dataflow between components in the first topology of components. The dataflow between components may be based on an order, sequence, interconnection, and/or dependency between at least some of the components in order to achieve the desired function, purpose, goal, or output from the first topology of components.

In one embodiment, prior to the system selecting the additional component, the system may determine that the first set of components are insufficient to complete any topology of components that would be capable of operating together, perform a required task or function, and/or achieve the desired function, purpose, goal, or output. This determination may be based on some criteria not being met, such as a maximum total execution time, a maximum or minimum number of cycles, every component in the first set of components not being able to communicate with one another in any topology, a cost of execution exceeding a threshold, etc. Once this determination is made, the system may determine whether removing component(s), adding component(s), and/or replacing component(s) would increase the likelihood that the desired function, purpose, goal, or output is achievable from a new topology and all criteria are met for execution of the topology of components. The system may iteratively make these determinations until a topology is selected that is capable of performing as needed.

Moreover, after the topology is implemented, the system may monitor performance of the implemented topology to determine if a better topology is available to perform the desired function, purpose, goal, or output. For example, the system may determine a topology that is actually capable of performing the desired function, purpose, goal, or output more quickly, more efficiently, less expensively, using less components, using more reliable components, etc. If a better topology is determined, the system may revise the implementation to coincide with the improved topology on-the-fly to enhance the performance of the implemented solution. A machine learning algorithm and/or model may be used to aid in making these determinations and/or to propose additional topologies and dataflow between components within the additional topologies, as described herein in one or more embodiments.

In another embodiment, the system may receive updated, modified, and/or additional sets of components for creation of a topology therefrom. For an updated set of components, the system may alter an existing topology to account for changes made to the set of components previously received, and may work in an iterative fashion to converge upon a best fit topology to achieve the desired function, purpose, goal, or output. For a new set of components, the system may again perform operations 400 to provide a new topology that meets all requirements of the user and available installation environments.

In one or more embodiments, the system receives a second user input that specifies and/or includes a functionality for the first set of components and/or the topology of components. This functionality describes the overall purpose of the topology, e.g., functionality as a whole. In these embodiments, any required additional components may be selected by the system in response to determining that the additional component(s) is necessary for implementing the functionality for the topology of components.

In one embodiment, the system may optimize the topology by determining which component is capable of accepting outputs from components specified in the first set of components. For example, if the set of components includes a Webhook, then a component that is configured to accept all outputs from the Webhook may be selected as the additional component, even if it causes a different component in the set of components to be redundant and/or unusable. In this case, the redundant/unused component is simply removed from the topology, resulting in a more optimized topology of components for implementation. In another example, assuming that Oracle International Corporation Unity is selected as a component, and there is a particular component also specified in the first set of components that is capable of accepting one of the outputs from Unity, the additional component that is selected may be a duplicate of the particular component to accept the other output from Unity.

In one or more embodiments, the system may receive a second user input that includes an updated set of components. In response to this second user input, the system determines which components from the first set of components have been removed or added to form the updated set of components. Based on this information, the system selects one or more first components to add to the second topology and/or one or more second components to remove from the second topology of components. The selection and choice of adding or removing components is based on: a) one or more characteristics respectively associated with each first component, b) one or more characteristics respectively associated with each second component, and c) one or more characteristics of the components removed or added from the first set of components. In this way, the system is able to account for all changes made to the first set of components when devising a new topology for arranging the updated set of components, along with optimizing the topology based on the characteristics of the added/removed/remaining components in the updated set of components. In an approach, the system uses this information to determine a) a third topology of components (which is based on the first set of components, the additional component, the one or more first components, and the one or more second components), and b) a dataflow between components in the third topology of components.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by at least one hardware processor, cause performance of operations comprising:
   receiving user input identifying a first set of user-selected components to be used for defining a topology of components;
   generating the topology of components at least by:
      identifying for each particular component, of the first set of user-selected components, one or more characteristics, the one or more characteristics being selected from a group comprising:
         a rule associated with the particular component;
         a requirement associated with the particular component;
         a data input type corresponding to the particular component; and
         a data output type corresponding to the particular component;
      based on the one or more characteristics respectively associated with at least one component of the first set of user-selected components: determining that an additional component, not included in the first set of user-selected components, is required for implementing a particular dataflow corresponding to the topology of components;
      selecting, by a system, the additional component to be included in the topology of components based on: a) the one or more characteristics respectively associated with at least one component of the first set of user-selected components, and b) one or more characteristics of the additional component; and
      determining, by the system: a) the topology of components comprising the first set of user-selected components and the system-selected additional component, and b) the particular dataflow corresponding to the topology of components.

2. The non-transitory computer readable medium of claim 1, wherein prior to the system selecting the system-selected additional component, the operations further comprise determining that the first set of user-selected components are insufficient to complete any topology of components.

3. The non-transitory computer readable medium of claim 1, wherein the operations further comprise selecting, by the system, an implementation environment for the system-selected additional component, the implementation environment comprising one of: an on-premise environment, an off-premise environment, and/or a cloud environment.

4. The non-transitory computer readable medium of claim 1, wherein the operations further comprise selecting, by the system, the system-selected additional component in response to determining that the system-selected additional component is associated with a first data input type that matches a first data output type corresponding to a first component of the first set of user-selected components.

5. The non-transitory computer readable medium of claim 4, wherein the operations further comprise selecting the system-selected additional component in response to further determining that none of the first set of user-selected components is associated with any data input type that matches the first data output type corresponding to the first component of the first set of user-selected components.

6. The non-transitory computer readable medium of claim 1, wherein the operations further comprise selecting, by the system, the system-selected additional component in response to determining that the system-selected additional component is associated with a first data output type that matches a first data input type corresponding to a first component of the first set of user-selected components.

7. The non-transitory computer readable medium of claim 6, wherein the operations further comprise selecting the system-selected additional component in response to further determining that none of the first set of user-selected components is associated with any data output type that matches the first data input type corresponding to the first component of the first set of user-selected components.

8. The non-transitory computer readable medium of claim 1, wherein the operations further comprise receiving a second user input comprising a functionality for the topology of components, wherein the system-selected additional component is selected by the system in response to determining that the system-selected additional component is necessary for implementing the functionality for the topology of components.

9. The non-transitory computer readable medium of claim 1, wherein the system-selected additional component is selected based further on a data input type of data to be transmitted to the topology of components.

10. The non-transitory computer readable medium of claim 1, wherein generating the topology of components comprises modifying a prior topology of components to generate the topology of components.

11. The non-transitory computer readable medium of claim 10, wherein the topology of components is generated at runtime while components in the prior topology of components are executed without interruption during a time in which the topology of components is generated.

12. The non-transitory computer readable medium of claim 1, wherein the operations further comprise:
receiving a second user input comprising an updated set of components;
determining, by the system, which components from the first set of user-selected components have been removed or added to form the updated set of components;
selecting, by the system, one or more first components to add to the topology and one or more second components to remove from the topology of components based on: a) one or more characteristics respectively associated with each first component, b) one or more characteristics respectively associated with each second component, and c) one or more characteristics of the components removed or added from the first set of user-selected components; and
determining, by the system: a) a third topology of components based on the first set of user-selected components, the system-selected additional component, the one or more first components, and the one or more second components, and b) a dataflow between components in the third topology of components.

13. A system comprising:
at least one hardware processor; and
a non-transitory computer readable medium comprising instructions which, when executed by the at least one hardware processor, cause performance of operations comprising:
receiving user input identifying a first set of user-selected components to be used for defining a topology of components;
generating the topology of components at least by:
identifying for each particular component, of the first set of user-selected components, one or more characteristics, the one or more characteristics being selected from a group comprising:
a rule associated with the particular component;
a requirement associated with the particular component;
a data input type corresponding to the particular component; and
a data output type corresponding to the particular component;
based on the one or more characteristics respectively associated with at least one component of the first set of user-selected components: determining that an additional component, not included in the first set of user-selected components, is required for implementing a particular dataflow corresponding to the topology of components;
selecting the additional component to be included in the topology of components based on: a) the one or more characteristics respectively associated with at least one component of the first set of user-selected components, and b) one or more characteristics of the additional component; and
determining: a) the topology of components comprising the first set of user-selected components and the additional component, and b) the particular dataflow topology of components.

14. The system of claim 13, wherein prior to selecting the additional component, the operations further comprise determining that the first set of user-selected components are insufficient to complete any topology of components.

15. The system of claim 13, wherein the operations further comprise selecting, by the system, an implementation environment for the additional component, the implementation environment comprising one of: an on-premise environment, an off-premise environment, and/or a cloud environment.

16. The system of claim 13, wherein the operations further comprise receiving a second user input comprising a functionality for the topology of components, wherein the additional component is selected in response to determining that the additional component is necessary for implementing the functionality for the topology of components.

17. A method comprising:
receiving user input identifying a first set of user-selected components to be used for defining a topology of components;
generating the topology of components at least by:
identifying for each particular component, of the first set of user-selected components, one or more characteristics, the one or more characteristics being selected from a group comprising:
a rule associated with the particular component;
a requirement associated with the particular component;
a data input type corresponding to the particular component; and
a data output type corresponding to the particular component;
based on the one or more characteristics respectively associated with at least one component of the first set of user-selected components: determining that an additional component, not included in the first set of user-selected components is required for implementing a particular dataflow corresponding to the topology of components;

selecting the additional component to be included in a topology of components based on:
- a) the one or more characteristics respectively associated with at least one component of the first set of user-selected components, and b) one or more characteristics of the additional component; and determining: a) the topology of components comprising the first set of user-selected components and the additional component, and b) the particular dataflow corresponding to the topology of components, wherein the method is performed by a system comprising at least one hardware processor.

18. The method of claim 17, further comprising, prior to selecting the additional component, determining that the first set of user-selected components are insufficient to complete any topology of components.

19. The method of claim 17, further comprising selecting, by the system, an implementation environment for the additional component, the implementation environment comprising one of: an on-premise environment, an off-premise environment, and/or a cloud environment.

20. The method of claim 17, further comprising receiving a second user input comprising a functionality for the topology of components, wherein the additional component is selected in response to determining that the additional component is necessary for implementing the functionality for the topology of components.

* * * * *